United States Patent
Hörnig

(10) Patent No.: US 7,731,424 B2
(45) Date of Patent: Jun. 8, 2010

(54) DETECTOR HOLDER, X-RAY SYSTEM AND X-RAY FLAT DETECTOR

(75) Inventor: Mathias Hörnig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/282,107

(22) PCT Filed: Jan. 31, 2007

(86) PCT No.: PCT/EP2007/050948

§ 371 (c)(1),
(2), (4) Date: Sep. 8, 2008

(87) PCT Pub. No.: WO2007/101758

PCT Pub. Date: Sep. 13, 2007

(65) Prior Publication Data

US 2009/0092230 A1    Apr. 9, 2009

(30) Foreign Application Priority Data

Mar. 9, 2006    (DE) .................. 10 2006 011 004

(51) Int. Cl.
*H01J 31/50*    (2006.01)

(52) U.S. Cl. ..................................... 378/189; 378/204
(58) Field of Classification Search ................... 378/19, 378/98.8, 189, 204
See application file for complete search history.

(56) References Cited

U.S. PATENT DOCUMENTS

| 5,511,106 A | 4/1996 | Doebert et al. |
| 5,690,893 A | 11/1997 | Ozawa et al. .................. 422/67 |
| 5,892,458 A | 4/1999 | Anderer et al. ........... 340/10.41 |
| 6,055,292 A | 4/2000 | Zeller et al. |
| 2003/0030721 A1 | 2/2003 | Nyholm |
| 2006/0067474 A1 * | 3/2006 | Schmitt ...................... 378/102 |
| 2006/0227934 A1 | 10/2006 | Beckhaus et al. |

* cited by examiner

*Primary Examiner*—Courtney Thomas
(74) *Attorney, Agent, or Firm*—Schiff Hardin LLP

(57) ABSTRACT

A detector holder for a flat panel x-ray detector has a mechanical plug interface that allows flat panel x-ray detectors of respectively different types to be connected to and held by the detector holder. An x-ray system equipped with such a detector holder can be used flexibly for different applications respectively requiring different types of flat panel x-ray detectors. The type of the flat panel x-ray detector currently retained by the detector holder can be automatically detected and used by the data processor that processed output signals from the currently-employed flat panel x-ray detector.

6 Claims, 1 Drawing Sheet

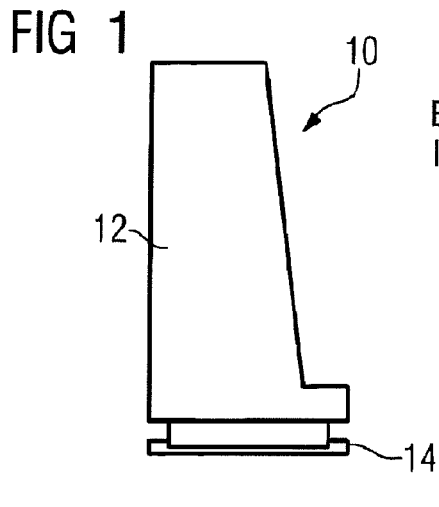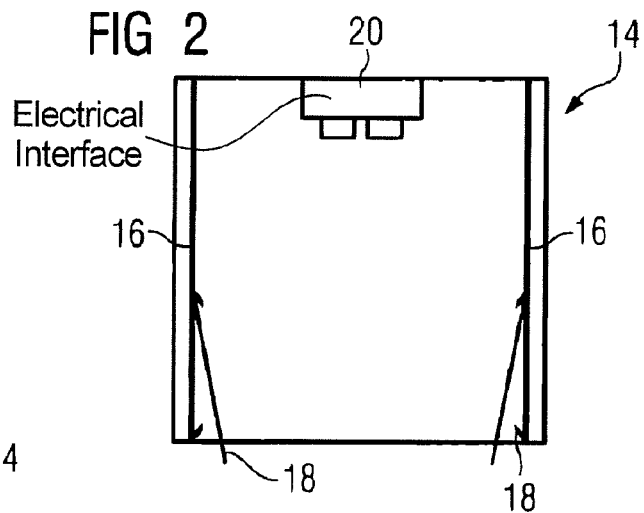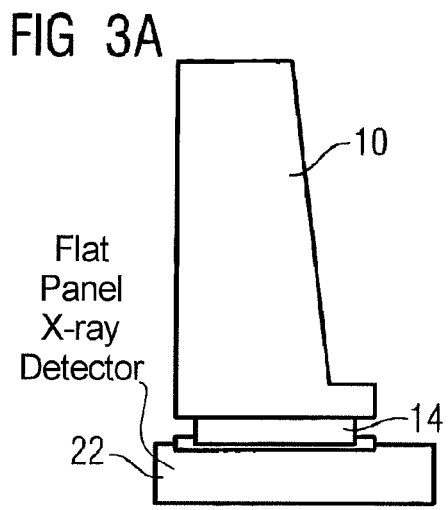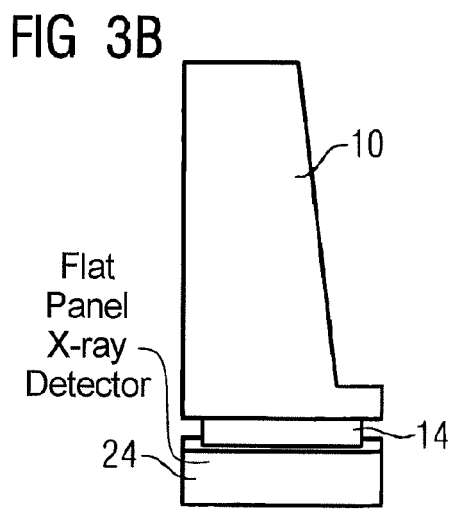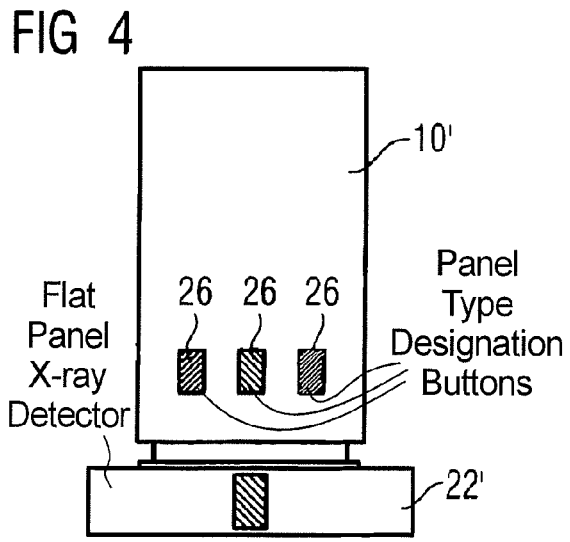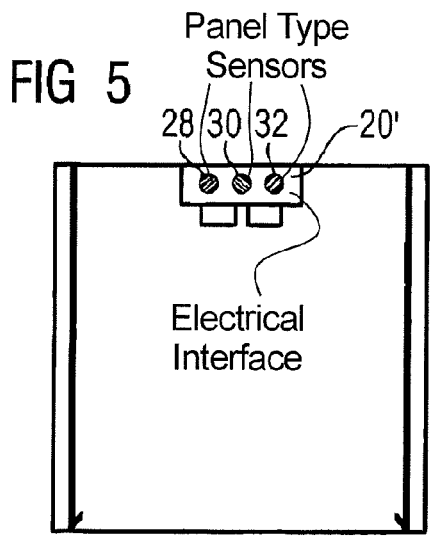

DETECTOR HOLDER, X-RAY SYSTEM AND X-RAY FLAT DETECTOR

BACKGROUND OF THE INVENTION

Field of the Invention

The present invention concerns a detector mount for a flat panel x-ray detector, an x-ray system with such a detector mount and a set of flat panel x-ray detectors of different types.

A number of x-ray systems with various flat panel detectors are commercially available. The flat panel detectors differ depending on the usage field, for example in the size of the active surface but also in the size of the individual detector elements. Different versions of flat panel x-ray detectors can be optimized for special requirements (in terms of their resolution, the signal-to-noise ratio, their size, shape etc.)

Flat panel x-ray detectors conventionally and rigidly connected with the respective x-ray system in a detector mount. They are typically bolted to such a detector mount. While larger research facilities and larger clinics can provide different x-ray systems depending on the desired application field, smaller facilities always use the same x-ray system, even if the flat panel x-ray detector is not ideally suited to the particular examination to be conducted.

SUMMARY OF THE INVENTION

An object of the present invention is to enable a more flexible usage of flat panel x-ray detectors.

This object is achieved by a detector mount according to the invention that has a mechanical plug interface. A flat panel x-ray detector can thus be connected (plugged in) and subsequently retained by the detector mount. This allows flat panel x-ray detectors of varying types (respectively adapted to the mechanical interface) to be used.

In a preferred embodiment, fixing with the use of bolts is no longer required at all; rather the plug system functions without a supplemental fixing having to be conducted.

For example, the mechanical plug interface can include rails in which the flat panel x-ray detector is directed and retained. A locking mechanism can be provided that (in the locked state) prevents that a flat panel x-ray detector directed on the rails (into an end position) can be slid down again from the rails or, respectively, can automatically slide out from these without unlocking the locking mechanism.

The detector mount preferably also has an electrical interface into which one or more plugs of the flat panel x-ray detector or a plug module can be plugged. The detector mount thus establishes not only the mechanical connection to the x-ray system but also the electrical.

The above object also is achieved in accordance with the invention by an x-ray system in which a detector mount as described above is a component. Such an x-ray system can be used flexibly because the usage of different flat panel x-ray detector types is enabled. An x-ray system typically has an electrical data processing device to process signals of the respective flat panel x-ray detector. Since, according to the invention, the flat panel x-ray detector can be exchanged, information concerning the type of the flat panel x-ray detector currently held by the detector mount should be provided for data processing.

In a preferred alternative embodiment, an input device is provided via which the corresponding information can be input. In the simplest case, the input device has multiple buttons (keys), wherein each button respectively corresponds to one type of flat panel x-ray detector, such that only the respective button must be pressed upon inserting the flat panel x-ray detector.

In a further embodiment, a detection device that automatically recognizes the type of flat panel x-ray detector retained by the detector mount is provided in the x-ray system.

The detection device can operate mechanically in a simple manner and, for example, detect the flat panel x-ray detector using its weight or using its size. The weight or size do not necessarily have to be measured exactly; rather, an approximate estimation that is sufficiently fine in order to differentiate the flat panel x-ray detectors from one another is enough.

Instead of such a measurement by the detection device, the detection device can be a detector system that recognizes markings on the flat panel x-ray detectors, for example. In a further embodiment the detection device detects signals emitted by the flat panel x-ray detectors.

The invention also encompasses a set of at least two flat panel x-ray detectors of different types (as individual components still separate from the x-ray system) that are all adapted in terms of their shape to the mechanical interface of the detector mount according to the invention. Any flat panel x-ray detector from the set of flat panel x-ray detectors of different types can be electively accommodated by the detector mount and retained. The x-ray system with the detector mount according to the invention and the described detector of flat panel x-ray detectors of different types are available to the user, such that the user can select a flat panel x-ray detector from the set, can insert it into the detector mount and can thus complete the x-ray system. An exchange of the flat panel x-ray detector is subsequently possible without problems. Bolts and other fasteners can be foregone since a mechanical plug interface is used to which the flat panel x-ray detectors are adapted. The handling is thereby significantly simplified, such that an exchange of the flat panel x-ray detector by typical operating personnel can occur without problems.

As mentioned above, a detection device which recognizes the type of flat panel x-ray detector can be provided at the x-ray system. In one variant, the detection device detects signals emitted by the flat panel x-ray detector. In this variant, the flat panel x-ray detectors of the set according to the invention are correspondingly, respectively equipped with a signal emitter. The differentiation between the various types of flat panel x-ray detectors can ensue according to three alternatives. The signal emitters can be attached at various locations of the flat panel x-ray detectors. The definition of the location is hereby to be viewed as relative to the insertion position in the detector mount. In other words, two signal emitters on two different flat panel x-ray detectors differ in their attachment location if, given an inserted flat panel x-ray detector, the signal emitter respectively emits a signal to another point of the detector mount. In the corresponding x-ray system, a corresponding detector can respectively be provided at each signal emitter, such that a specific detector is activated by a specific type of flat panel x-ray detector. This can ensue with the use of light signals.

Both with the use of acoustic signals and the use of optical signals, the flat panel x-ray detectors of different types can differ by the acoustic or optical signal frequencies emitted by the signal unit. A third option is that they merely emit different signal strengths, wherein the detection device at the x-ray system must then be suitable to measure the signal strength. For example, a photodiode can measure the intensity of a light beam emitted by an LED.

BRIEF DESCRIPTION OF THE DRAWINGS

FIG. 1 is a side view of a detector mount according to the invention.

FIG. 2 is a bottom view of a detector mount according to the invention.

FIGS. 3A and 3B respectively show the detector mount according to FIG. 1, with different flat panel detectors thereon.

FIG. 4 is a side view of detector amount according to an embodiment of the invention, including an input device that provides information about the flat panel x-ray detector type currently mounted thereon.

FIG. 5 is a view of an embodiment of the detector mount of FIG. 2, with a detection device attached thereto that detects signals from a flat panel x-ray detector mounted on the detector mount.

DESCRIPTION OF THE PREFERRED EMBODIMENTS

A detector mount presented in FIG. 1 is designated as a whole with 10 and comprises a base body 12 with a mechanical interface 14. The mechanical interface 14 is presented in more detail in the bottom view according to FIG. 2.

Two rails 16 are provided onto which a flat panel x-ray detector can be slid given corresponding design of the flat panel x-ray detector. For example, a half-groove or groove can be provided in a housing of the flat panel x-ray detector, which half-groove or, respectively, groove serves to guide the appertaining flat panel x-ray detector given a flat panel x-ray detector adapted to the width of the detector mount (seen in FIG. 1). The mechanical interface 14 has a locking mechanism 18: if the flat panel x-ray detector is slid sufficiently far on the mechanical interface, the mechanism locks. For example, it engages in corresponding recesses at the flat panel x-ray detector housing. A desired position of the flat panel x-ray detector is provided by an electrical interface (interface) 20 into which a corresponding plug of a flat panel x-ray detector can be inserted.

The fact that a plug interface 14 is used in the detector mount 14 leads to the situation that different flat panel detectors can be plugged in if they are only adapted in terms of their shape to the plug interface 14 (and has a plug for the electrical interface). Flat panel x-ray detectors of different types can correspondingly be used; for example, a larger flat panel x-ray detector 22 (FIG. 3A) can be plugged into the plug interface 14, or a smaller flat panel x-ray detector 24 (FIG. 3B) can be retained on the detector mount.

The detector mount is typically part of an x-ray system (with x-ray source, possibly patient table etc.), wherein instead of a permanently provided flat panel x-ray detector the selection between various flat panel x-ray detectors 22 and 24 illustrated in FIG. 3A and FIG. 3B can now occur. The x-ray system can correspondingly serve for different applications; for example, the flat panel x-ray detector 22 can serve for generation of images of the lungs while the smaller flat panel x-ray detector 24 is suitable for images of the heart.

Due to the exchange capability of the flat panel x-ray detectors, a possibility is required for the x-ray system to obtain information about the connected (interface 20) flat panel x-ray detector. Flat panel x-ray detectors typically have no separate computer processing unit that would directly output corresponding information via the electrical interface 20. The x-ray system can thus be programmed such that it recognizes the different flat panel x-ray detectors from the type of their signals. However, such a programming need not be complicated. In a simplified version, push buttons (or key buttons etc.) 27 are provided on a detector mount 10'. For example, different flat panel x-ray detectors can respectively be associated with one of the buttons 26 through the use of a color code. The operator who plugs the respective flat panel x-ray detector into the mechanical interface 14 thereby presses the respective button 26 and thus provides corresponding information for the x-ray system.

The detection of the flat panel x-ray detector can also ensue automatically.

For example, FIG. 5 again presents the bottom view of a detector mount according to the invention, wherein this time the electrical interface 20' is provided with three different sensors 28, 30 and 32. Given three different types of flat panel x-ray detectors to be used, it can be provided that an LED is attached to each type, which LED comes to lie exactly at one of the sensors 28, 30 and 32 given insertion of the flat panel x-ray detector into the electrical interface 20' so that the corresponding signal is received by only one of the sensors 28, 30 and 32. If the location of the LED varies from flat panel x-ray detector type to flat panel x-ray detector type, one time only the sensor 28 is activated, a different time only the sensor 30, and another time the sensor 32, such that—via an intelligent evaluation unit in the x-ray system—an evaluation can ensue to the effect that information is provided about the type of flat panel x-ray detector that is retained by the detector mount.

In an alternative embodiment, the units 28, 30 and 32 can have respective LEDs, and corresponding receivers are then provided on the flat panel x-ray detector. Theoretically, the presence of a single receiver is also sufficient if flat panel x-ray detectors of different types emit signals of varying intensity, such that an unambiguous conclusion about the respective flat panel x-ray detectors can be made based on the received intensity.

In a further embodiment that is not shown in the drawings, the detector mount recognizes the various flat panel x-ray detectors using their size, for example using photoelectric barrier systems. A corresponding detection device does not necessarily have to be provided at the detector mount itself; rather, it can be arranged anywhere in the x-ray system.

Although modifications and changes may be suggested by those skilled in the art, it is the intention of the inventor to embody within the patent warranted heron all changes and modifications as reasonably and properly come within the scope of his contribution to the art.

I claim as my invention:

1. An x-ray system comprising:
an x-ray source;
a flat panel x-ray detector that detects x-rays emitted by said x-ray source;
a detector mount for said flat panel x-ray detector, said detector mount comprising a mount body having a mechanical plug interface that releasably connects to and retains said flat panel x-ray detector;
a data processing device configured to receive and process output signals from said flat panel x-ray detector produced by x-rays from said x-ray source that are incident on said flat panel x-ray detector; and
a detection device that automatically identifies a type of said flat panel x-ray detector currently connected to and retained by said mechanical plug interface of said detector mount, said detector device emitting a detector device output designating said type and being in communication with said data processing device to supply said detector device output thereto for use by said data processing device in processing said output signals from said flat panel x-ray detector.

2. An x-ray system as claimed in claim 1 wherein said flat panel x-ray detector has a weight and a size, and wherein said detection device detects at least one of said weight or said size to identify said type of said flat panel x-ray detector.

3. An x-ray detection assembly comprising:
a plurality of different types of flat panel x-ray detectors each comprising a detector mechanical interface, the respective detector mechanical interfaces being identical;
a detector mount comprising a mount body carrying a releasable mount mechanical interface that structurally mates with each of said detector mount interfaces to allow any of said plurality of flat panel x-ray detectors of different types to be temporarily releasably connected to said mount body; and
each of said flat panel detectors in said plurality of flat panel detectors comprising a signal emitter that emits a signal identifying the type of that flat panel x-ray detector, said signal emitter identifying an attachment location that is unique to that flat panel x-ray detector.

4. An x-ray detection assembly comprising:
a plurality of different types of flat panel x-ray detectors each comprising a detector mechanical interface, the respective detector mechanical interfaces being identical;
a detector mount comprising a mount body carrying a releasable mount mechanical interface that structurally mates with each of said detector mount interfaces to allow any of said plurality of flat panel x-ray detectors of different types to be temporarily releasably connected to said mount body; and
each flat panel x-ray detector in said plurality of flat panel x-ray detectors comprising a signal emitter that emits a signal having a signal characteristic that identifies the type of that flat panel x-ray detector.

5. An x-ray detection assembly as claimed in claim 4 wherein said signal emitter is a signal emitter selected from the group consisting of optical signal emitters and acoustical signal emitters.

6. An x-ray detection assembly as claimed in claim 4 wherein said signal characteristic is selected from the group of signal frequency and signal amplitude.

* * * * *